July 1, 1924.
C. H. HIPP ET AL
1,500,075
GLARE SHIELD FOR HEADLIGHTS
Filed March 31, 1923
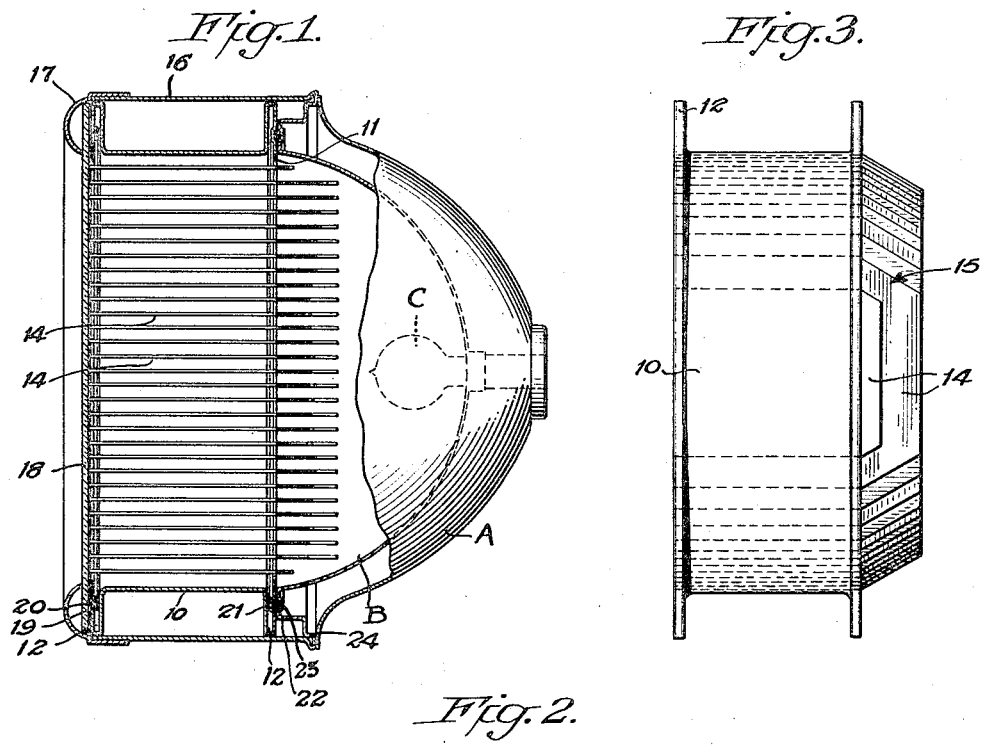
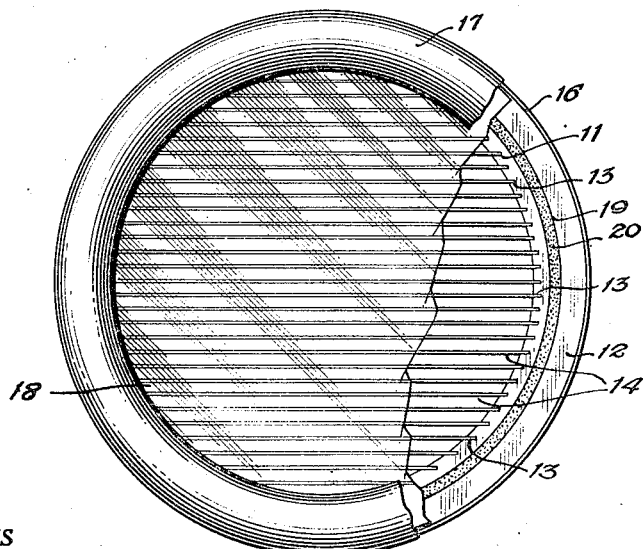
WITNESSES
Bernard Aebly
Hugh H. Cett
INVENTOR
CHARLES H. HIPP
SHERMAN L. KISER
BY
ATTORNEYS Patented July 1, 1924.

1,500,075

UNITED STATES PATENT OFFICE.

CHARLES H. HIPP, OF CAMP LEWIS, WASHINGTON, AND SHERMAN LEO KISER, OF HUTCHINSON, KANSAS.

GLARE SHIELD FOR HEADLIGHTS.

Application filed March 31, 1923. Serial No. 629,107.

*To all whom it may concern:*

Be it known that we, CHARLES H. HIPP and SHERMAN L. KISER, citizens of the United States, and residents, respectively, of Camp Lewis, Washington, and Hutchinson, in the county of Reno and State of Kansas, have invented a new and Improved Glare Shield for Headlights, of which the following is a full, clear, and exact description.
This invention has relation to headlights for motor vehicles and has particular reference to an attachment therefor to eliminate the blinding glare in the eyes of pedestrians or drivers of approaching vehicles.
One of the principal objects of the present invention is to provide an attachment of the character described which serves to eliminate the glare and at the same time in no way impairs the light of the roadway in advance of the vehicle.

As a further object the invention aims to provide a glare shield for headlights which may be readily attached to the ordinary forms of headlights now in general use without materially altering the construction of the same.

The invention further contemplates an attachment for vehicle headlights which in addition to serving as a glare shield will function to increase the vision of the driver of a vehicle in a fog or rain.

As a still further object the invention aims to provide a device of the character set forth which is extremely simple in construction, inexpensive to manufacture and which is thoroughly reliable and highly efficient in its purpose.

With the above recited and other objects in view, the invention resides in the novel construction set forth in the following specification, particularly pointed out in the appended claims and illustrated in the accompanying drawing, it being understood that the right is reserved to embodiments other than those actually illustrated herein to the full extent indicated by the general meaning of the terms in which the claims are expressed.

In the drawing—
Figure 1 is a fragmentary longitudinal sectional view through a headlight and glare shield constructed in accordance with the invention.

Fig. 2 is a front view thereof, parts being broken away to disclose the underlying structure.

Fig. 3 is a plan view of the glare shield removed.

Referring to the drawing by characters of reference A designates the outer shell or casing of a headlight of standard construction and B the inner parabolic reflecting shell which is designed to normally diffuse the light rays from the lamp C therefrom to spread the same and cast reflections at various angles from said reflecting surface. The glare shield which constitutes the invention consists of a cylindrical supporting member 10 formed at its opposite ends with inwardly projecting annular flanges 11 and outwardly projecting annular flanges 12. The flanges 11 are provided with vertically spaced notches 13 in the opposed side edges thereof to receive a plurality of vertically spaced vanes 14. The rear ends of the vanes 14 have their rear corners cut away as at 15 whereby when the glare shield is supported in axial prolongation from the headlight, the cutaway portions of the rear ends of the vanes compensating for the curvature of the inner reflecting shell B so as not to contact therewith. In the standard forms of headlights the door which carries the lens is not of sufficient length to allow for the installation of the glare shield, and for this reason a substitute door for containing the glare shield will be furnished or provided with the glare shield. As illustrated in the drawing the substitute door will consist of a cylindrical section 16 of a diameter to snugly receive the outer flanges 12. An annular section constituting an inwardly curved bead 17 is threadedly engaged over the outer end of the cylindrical section 16 against which the lens 18 will engage. The lens will be maintained against the annular section or bead 17 by the outer end of the glare shield, the outer flange 12 of which is provided with an annular groove 19 in which a gasket 20 is seated to impinge against the inner face of the lens. The other outer flange 12 is likewise provided with an annular gasket seat 21 in which a gasket 22 is arranged to seat against the outturned portion 23 of the reflecting shell when the inner end of the cylindrical section of the door 16 is engaged over the door seat 24. When installed on the lamp, the lamp and glare shield are tilted downwardly at approximately a three degree angle so that it will be impossible for the glare to be seen above the level of the lamp regardless of how far the observer is away from the same. The arrangement of the glare shield permits only parallel light rays to be projected through the vanes or deflectors 14 thereby cutting off all vertical angular rays or reflections while permitting a straight or axial reflection and lateral angular reflections to be cast from the headlight. It will thus be seen that a slight downward tilting will shield from the eyes of an observer all reflection or glare from the reflecting element of the headlight, without in any way detracting from the illumination of the road in advance of the vehicle.

We claim:

1. In a glare shield for headlights, means associated with said headlight for eliminating the casting of vertical angular reflections while permitting of the casting of horizontal angular reflections and axial reflections, said means comprising a plurality of vertically spaced horizontal vanes projecting forwardly and disposed immediately in advance of the headlight reflecting element, and a support for said vanes consisting of a cylindrical body having inwardly projecting annular flanges at its opposite ends, said flanges formed with aligned notches receiving the side edges of said vanes.

2. A glare shield of the character described comprising a cylindrical body having outwardly and inwardly projecting annular flanges at its opposite ends and of a diameter approximately equal to the diameter of the reflecting element of a headlight, horizontal aligned notches in the inner flanges, and a plurality of vanes having their side edges respectively engaged in the aligned notches of the inner flanges.

3. A glare shield of the character described comprising a cylindrical body having outwardly and inwardly projecting annular flanges at its opposite ends and of a diameter approximately equal to the diameter of the reflecting element of a headlight, horizontal aligned notches in the inner flanges, a plurality of vanes having their side edges respectively engaged in the aligned notches of the inner flanges, and means for associating said glare shield with the headlight comprising a cylindrical member having an inwardly projecting annular bead at its outer end and a transparent lens within which member the outwardly projecting flanges of the supporting body are snugly received, said supporting member telescopically engaging over the forward end of the headlight.

CHARLES H. HIPP.
SHERMAN LEO KISER.